United States Patent [19]

Mukaiya et al.

[11] Patent Number: 5,056,900
[45] Date of Patent: Oct. 15, 1991

[54] ZOOM LENS

[75] Inventors: Hitoshi Mukaiya, Saitama; Akihisa Horiuchi, Kanagawa; Yasunori Murata, Tokyo; Akihiro Nishio, Kanagawa, all of Japan

[73] Assignee: Canon Kabushiki Kaisha, Tokyo, Japan

[21] Appl. No.: 594,957

[22] Filed: Oct. 10, 1990

[30] Foreign Application Priority Data

Oct. 31, 1989 [JP] Japan .................................. 1-285891

[51] Int. Cl.$^5$ .............................................. G02B 15/14
[52] U.S. Cl. .................................... 359/676; 359/683
[58] Field of Search ................................. 350/423, 427

[56] References Cited

U.S. PATENT DOCUMENTS 4,720,181  1/1988  Hata ..................................... 350/427

Primary Examiner—Scott J. Sugarman
Attorney, Agent, or Firm—Fitzpatrick, Cella, Harper & Scinto

[57] ABSTRACT

A zoom lens comprising a first lens unit of positive power, a second lens unit of negative power as the variator, a third lens unit of negative power as the compensator, and a fourth lens unit of positive power stationary during zooming, the fourth lens unit being composed of a bi-convex first lens, a positive second lens, a negative third lens of strong concave curvature at the front, a positive fourth lens, a fifth lens of strong concave curvature at the rear, and a positive sixth lens, and satisfying the following condition:

$$0.5 < D/Fw < 1.5$$

where D is the air separation between the fourth and fifth lenses, and Fw is the shortest focal length of the entire lens system.

4 Claims, 16 Drawing Sheets

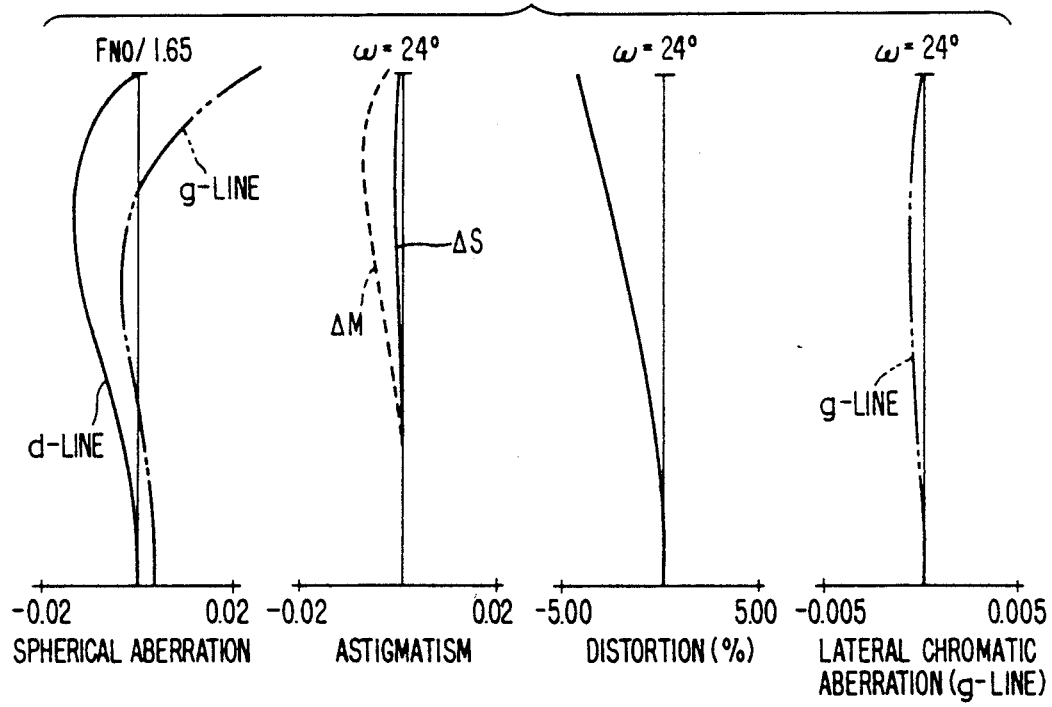
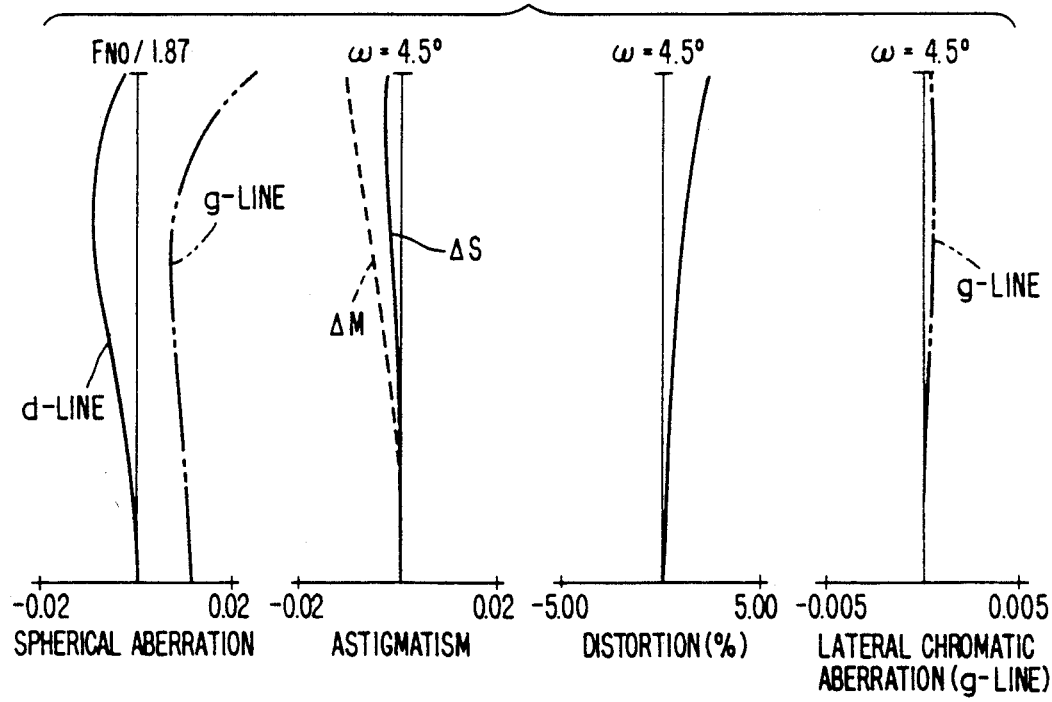

ZOOM LENS

BACKGROUND OF THE INVENTION

1. Field of the Invention

This invention relates to improvements of the zoom lens of compact size and light weight, while still maintaining an F-number of 1.6–2.0 or thereabout and a zoom ratio of about 6, suited to video cameras or still cameras.

2. Description of the Related Art

In the so-called 4-component zoom type, the combination of the zoom ratio of about 6 with the use of 6 members in the fourth lens unit which has the image forming function is exemplified by previous proposals in Japanese Patent Publication No. Sho 63-61642, Japanese Laid-Open Patent Application No. Sho 62-91908 and others.

But, in recent years, the image pickup element has its size get smaller, for example, from ½ inch to ⅓ inch. To preserve the standard angle of view, therefore, it is necessary to relatively decrease the focal length of the zoom lens. To rely on shortening the focal length of the relay lens unit, however, results in a difficulty of assuring the prescribed value of the back focal distance for disposing the filter. This problem can be solved by reducing the air spacing within the relay lens unit, so that the rear principal point of that relay lens unit falls at a shorter distance. Such a shortening of the spacing between the front and rear lens sub-units of the relay lens unit, as proposed in the Japanese Laid-Open Patent Application No. Sho 62-91908 and others, however, leads to difficult aberrational problems. Particularly in the intermediate angle of view, the coma flare and the curvature of field are caused to increase largely. Thus, an adverse tendency is brought in with an increase of the residual amount of aberrations when it should be further minimized in view of the decreased size of the image frame.

Hence, there is a growing desire for such an optical system that, while making it possible to adequately leave the spacing between the front and rear lens sub-units of the relay lens unit in order to correct aberrations with ease, the back focal distance, too, is secured sufficiently.

SUMMARY OF THE INVENTION

With such problems in mind, the present invention provides a zoom lens which has its optically effective diameter made smaller and its total length made shorter for the purpose of facilitating minimization of the bulk and size, while nevertheless maintaining fulfillment of the requirements of realizing an F-number range of 1.6–2.0 or thereabout, of well correcting variation of aberrations throughout the extended zooming range, and further of securing a sufficiently long back focal distance as is equal to about 1.7 to 2.0 times the focal length at the wide-angle end, to be achieved.

To achieve this object, according to the invention, in a preferred embodiment thereof, a zoom lens of the so-called 4-component structure comprises from front to rear, a first lens unit for focusing, a second lens unit axially movable for varying the image magnification, a third lens unit axially movable for compensating for the shift of an image plane resulting from the variation of the image magnification, and a fourth lens unit for image formation stationary during the variation of the image magnification, wherein the fourth lens unit is constructed with a first/fourth lens unit composed of a bi-convex lens for converting a strongly divergent light beam made by the third lens unit into a weakly divergent light beam, and a second/fourth lens unit composed of a positive lens, a negative lens having a strong concave surface facing the object side, a positive lens followed by an air separation D, a negative lens having a strong concave surface facing the image side and a positive lens, whereby the following condition is satisfied:

$$0.5 < D/Fw < 1.5 \tag{1}$$

where Fw is the shortest focal length of the entire lens system.

BRIEF DESCRIPTION OF THE DRAWINGS

FIGS. 9(A) and 9(B), FIGS. 10(A) and 10(B), FIGS. 11(A) and 11(B), FIGS. 12(A) and 12(B), FIGS. 13(A) and 13(B), FIGS. 14(A) and 14(B), FIGS. 15(A) and 15(B) and FIGS. 16(A) and 16(B) are graphic representations of the aberrations of the lenses of FIGS. 1 through 8.

Figure 1:
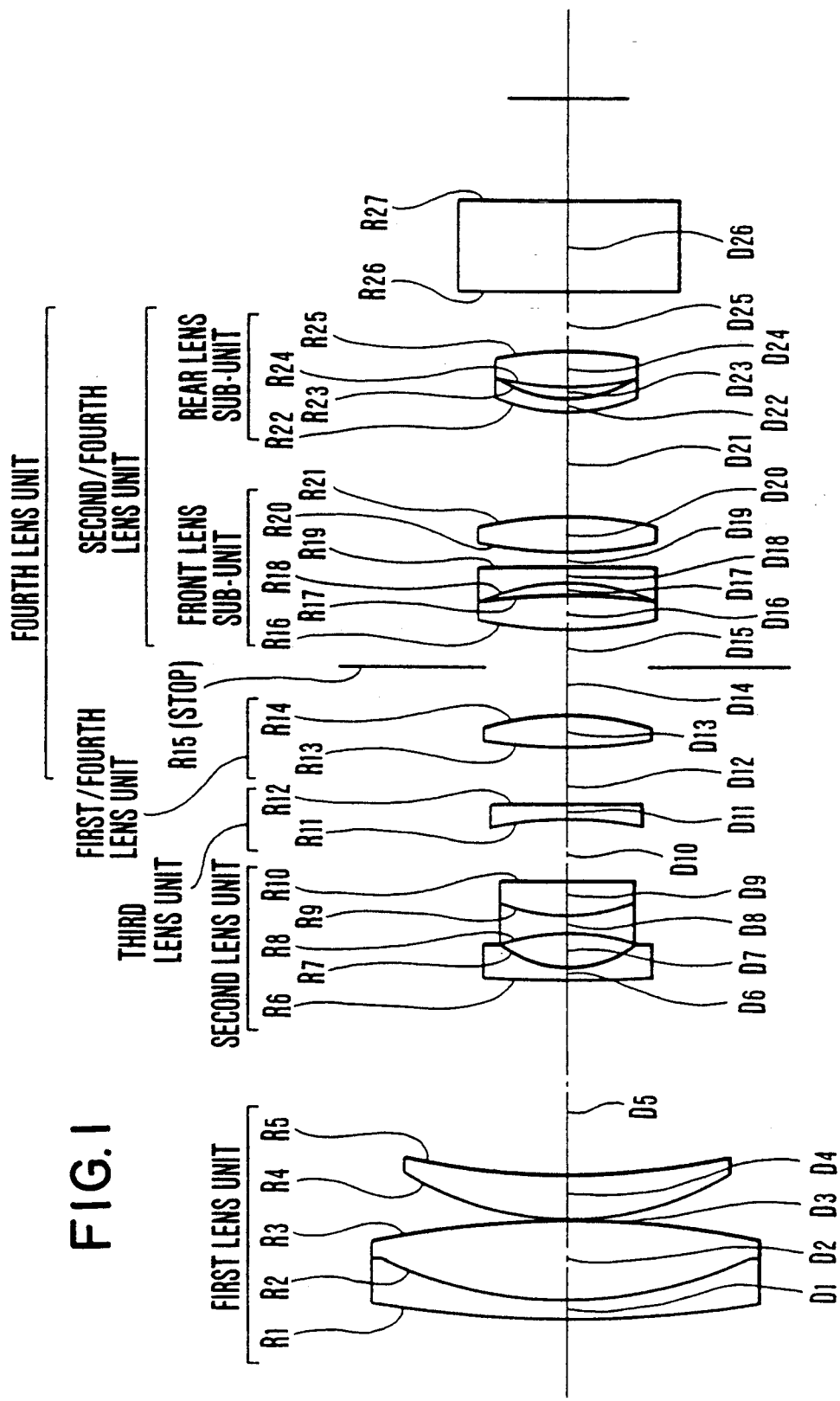
FIG. 1 through FIG. 8 are longitudinal section views of numerical examples 1 through 8 of zoom lenses of the invention.

In these graphs, the aberration curves of the figure numbers with suffix (A) are in the wide-angle end, and the curves of the figure numbers with suffix (B) in the telephoto end. In addition, d and g represent the spectral d-line and g-line respectively, and $\Delta S$ and $\Delta M$ represent the sagittal image surface and the meridional image surface respectively.

DETAILED DESCRIPTION OF THE PREFERRED EMBODIMENTS

The present invention is next described in connection with embodiments thereof.

FIG. 1 through FIG. 8 show specific zoom lenses embodying the features of the invention. In the general embodiment, as shown by these figures, a zoom lens of the so-called 4-component type comprises, from front to rear, a first lens unit having a positive refractive power and movable for focusing, a second lens unit having a negative refractive power and axially movable for varying the image magnification, a third lens unit having a negative refractive power and axially movable for compensating for the image shift resulting from the variation of the image magnification, and a fourth lens unit having a positive refractive power and stationary during the variation of the image magnification to form an image, wherein the first lens unit is constructed with a negative meniscus lens having a strong concave surface facing the image side, a convex lens and a positive meniscus lens having a strong convex surface facing the object side in this order from the front, the second lens unit is constructed with a negative lens having a strong concave surface facing the image side, a bi-concave lens and a bi-convex lens in this order from the front, the third lens unit is constructed with a negative meniscus lens having a strong concave surface facing the object side, and the fourth lens unit is constructed with a first-/fourth lens unit composed of a bi-convex first lens for converting a strongly divergent light beam made by the third lens unit into a weakly divergent light beam and a second/fourth lens unit composed of a front lens sub-unit having a positive second lens, a negative third lens having a strong concave surface facing the object side and a positive fourth lens followed by an air separation D, and a rear lens sub-unit having a negative fifth lens having a strong concave surface facing the image side and a positive sixth lens.

In particular, by using the positive-negative-positive power arrangement in the front lens sub-unit of the relay lens unit or fourth lens unit, good correction of spherical aberration is assured, while securing the back focal distance is secured. And, the invention sets forth a condition: $0.5 < D/F_w < 1.5$ ... (1) where $F_w$ is the shortest focal length of the entire lens system. When this condition is satisfied, a good stability of aberration correction is attained in the zoom lens of long back focal distance.

Next, each of the features of the invention is explained by using the specific examples of the embodiment.

The inequalities of condition (1) define a range of the air separation between the front lens sub-unit and the rear lens sub-unit of the second/fourth lens unit. When the upper limit is exceeded, the entirety of the lens system is hindered from getting a more compact form and further the sufficient length of the back focal distance becomes impossible to secure. When the lower limit is exceeded, the on-axial aberrations and the off-axial aberrations become difficult to correct while taking balance therebetween. So, despite the achievement of the good correction of spherical aberration which belongs to the on-axial aberrations, the coma flare increases in the intermediate angle of view and the curvature of field also increases objectionably. If further desired, the image forming magnification $\beta$ of the second/fourth lens unit lies in the following range:

$$-0.3 < \beta < -0.08 \quad (2)$$

The inequalities of condition (2) mean that the light beam after passing through the first/fourth lens unit is converted into a weakly divergent light beam. Thereby, it is made possible to elongate the back focal distance of the photographic lens system under the condition that the image forming magnification of the second/fourth lens unit takes a certain predetermined value. When the upper limit is exceeded, it becomes difficult to secure the predetermined length of the back focal distance. When the lower limit is exceeded, the use of the second-/fourth lens unit for correcting the position of the focal plane, or adjusting the so-called tracking, as it moves, results in an objectionably large variation of aberrations.

To further improve the aberration correction, it is preferred that the curvature values (1/radius of curvature) $\phi_A$ and $\phi_B$ of the front and rear surfaces of the positive fourth lens in the second/fourth lens unit respectively and the focal lengths $F_A$ and $F_B$ of the front lens sub-unit and the rear lens sub-unit of the second-/fourth lens unit respectively satisfy the following conditions:

$$-1.5 < \phi_B/\phi_A < 0 \ (\phi_A > 0, \phi_B < 0) \quad (3)$$

$$0.9 < F_B/F_A < 2.4 \quad (4)$$

These features are explained below.

The inequalities of condition (3) concern with the factor for determining the position of the principal point of the front lens sub-unit of the second/fourth lens unit. In this respect, of the lenses in the front lens sub-unit of the second/fourth lens unit, the rearmost one, i.e., the bi-convex lens, is chosen to set forth a rule of design by means of the curvatures of both of its surfaces. The position of the rear principal point of the front lens sub-unit of the second/fourth lens unit is a very important factor on the control of the spacing between the front lens sub-unit and the rear lens sub-unit of the second/fourth lens unit. If, as the interval between the principal points of the front lens sub-unit and the rear lens sub-unit is ascertained, it happens that the rear principal point of the front lens sub-unit takes its place in the interior of that front lens sub-unit, the air spacing can no longer be kept sufficient. From this reason, when the upper limit of the inequalities of condition (3) is exceeded, the position of the rear principal point of the front lens sub-unit tends to enter the inside of the front lens sub-unit itself.

Again, the front lens sub-unit of the second/fourth lens unit has a function of converging a light beam. Therefore, when the lower limit of the inequalities of condition (3) is exceeded, the last surface of the front lens sub-unit of the second/fourth lens unit produces spherical aberrations of higher order which are difficult to correct.

The inequalities of condition (4) concern with the power arrangement of the front lens sub-unit and the rear lens sub-unit in the second/fourth lens unit. The use of a large value of this factor leads to relatively easily correct aberrations, because the aberration correction can be made under the condition that the rear lens sub-unit has a small refractive power. But the spacing between the front lens sub-unit and the rear lens sub-unit is caused to decrease, or if that spacing is preserved, the refractive power of the front lens sub-unit is caused to increase. Thus, the back focal distance tends to shorten. Hence, the violation of the upper limit effects a result of making insufficient both of the preservation of the spacing and the preservation of the back focal distance. The use of a small value of this factor, on the other hand, makes it possible to elongate the back focal distance while preserving the air spacing between the front lens sub-unit and the rear lens sub-unit. But when the lower limit is exceeded, as it implies that the front lens sub-unit gets a poor refractive power, the light beam emerging from the front lens sub-unit is not very convergent. Therefore, the outer diameter of the rear lens sub-unit is increased largely. The total length also becomes long. Thus, these results are contradictory to the aim of advancing the compactness.

Next, the numerical examples of the invention are given below. In the numerical data, Ri is the radius of curvature of the i-th lens surface when counted from the front, Di is the i-th axial lens thickness or air separation when counted from the front, and Ni and $\gamma i$ are respectively the refractive index and Abbe number of the glass of the i-th lens element when counted from the front.

In Table-1, there are listed the values of the factors in the above-defined conditions for the numerical examples. Incidentally, R26 and R27 define a glass block such as optical filter or face plate. Again in that table, BF stands for the back focal distance with this glass block reduced by air.

TABLE 1

| Numerical Example | Condition (1) | (2) | (3) | (4) | BF/Fw |
|---|---|---|---|---|---|
| (1) | 0.9715 | −0.206 | −1.0 | 1.479 | 2.029 |
| (2) | 0.7460 | −0.138 | −1.0 | 1.811 | 1.918 |
| (3) | 0.9647 | −0.226 | −1.0 | 1.577 | 2.043 |
| (4) | 1.2080 | −0.143 | −1.355 | 1.037 | 1.964 |
| (5) | 1.3380 | −0.084 | −1.428 | 1.931 | 1.769 |
| (6) | 0.8968 | −0.122 | −0.262 | 1.643 | 1.706 |
| (7) | 0.8879 | −0.162 | −1.305 | 1.403 | 1.914 |
| (8) | 0.8330 | −0.147 | −1.185 | 2.143 | 1.911 |

Figure 9A:
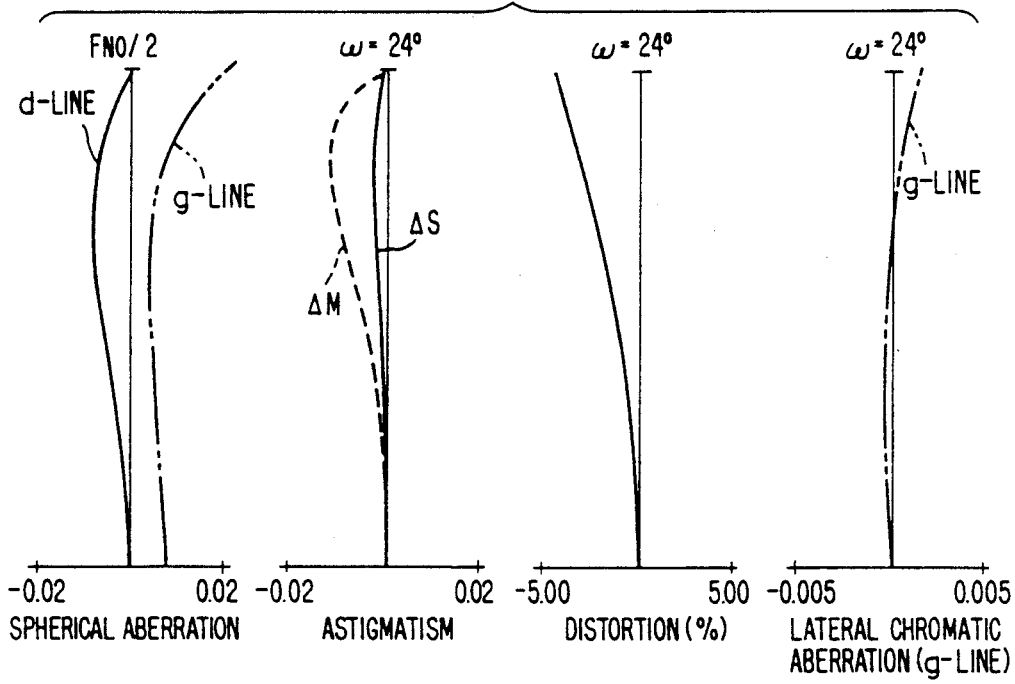
Figure 9B:
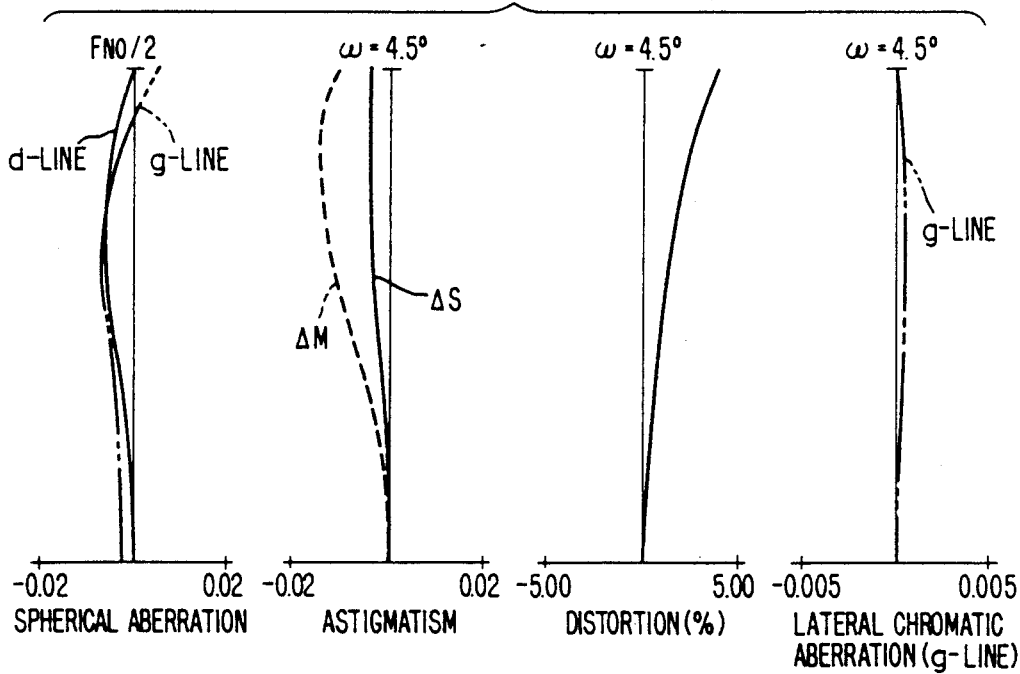

Numerical Example 1 (FIGS. 1, 9(A) and 9(B))

F = 1-5.7   FNo = 1:2   2ω = 48°-9°

| | | | |
|---|---|---|---|
| R1 = 9.608 | D1 = 0.159 | N1 = 1.80518 | ν1 = 25.4 |
| R2 = 3.803 | D2 = 0.736 | N2 = 1.51633 | ν2 = 64.1 |
| R3 = −8.834 | D3 = 0.027 | | |
| R4 = 2.927 | D4 = 0.430 | N3 = 1.63854 | ν3 = 55.4 |
| R5 = 9.488 | D5 = Variable | | |
| R6 = 10.307 | D6 = 0.111 | N4 = 1.69680 | ν4 = 55.5 |
| R7 = 1.175 | D7 = 0.340 | | |
| R8 = −1.600 | D8 = 0.111 | N5 = 1.69680 | ν5 = 55.5 |
| R9 = 1.600 | D9 = 0.333 | N6 = 1.84666 | ν6 = 23.8 |
| R10 = ∞ | D10 = Variable | | |
| R11 = −3.205 | D11 = 0.111 | N7 = 1.77250 | ν7 = 49.6 |
| R12 = −63.136 | D12 = Variable | | |
| R13 = 6.730 | D13 = 0.277 | N8 = 1.67003 | ν8 = 47.3 |
| R14 = −2.996 | D14 = 0.458 | | |
| R15 = (Stop) | D15 = 0.347 | | |
| R16 = 3.796 | D16 = 0.333 | N9 = 1.71999 | ν9 = 50.3 |
| R17 = −5.034 | D17 = 0.116 | | |
| R18 = −2.009 | D18 = 0.111 | N10 = 1.80518 | ν10 = 25.4 |
| R19 = 4359.769 | D19 = 0.138 | | |
| R20 = 3.804 | D20 = 0.333 | N11 = 1.63854 | ν11 = 55.4 |
| R21 = −3.804 | D21 = 0.971 | | |
| R22 = 2.042 | D22 = 0.111 | N12 = 1.80518 | ν12 = 25.4 |
| R23 = 1.316 | D23 = 0.083 | | |
| R24 = 2.444 | D24 = 0.333 | N13 = 1.62374 | ν13 = 47.1 |
| R25 = −4.739 | D25 = 0.555 | | |
| R26 = ∞ | D26 = 0.833 | N14 = 1.51633 | ν14 = 64.1 |
| R27 = ∞ | | | |

Lens Separations during Zooming

| Focal Length | D5 | D10 | D12 |
|---|---|---|---|
| 1.00 | 0.17 | 2.56 | 0.52 |
| 2.85 | 1.75 | 0.59 | 0.52 |
| 5.70 | 2.38 | 0.27 | 0.22 |

Figure 2:
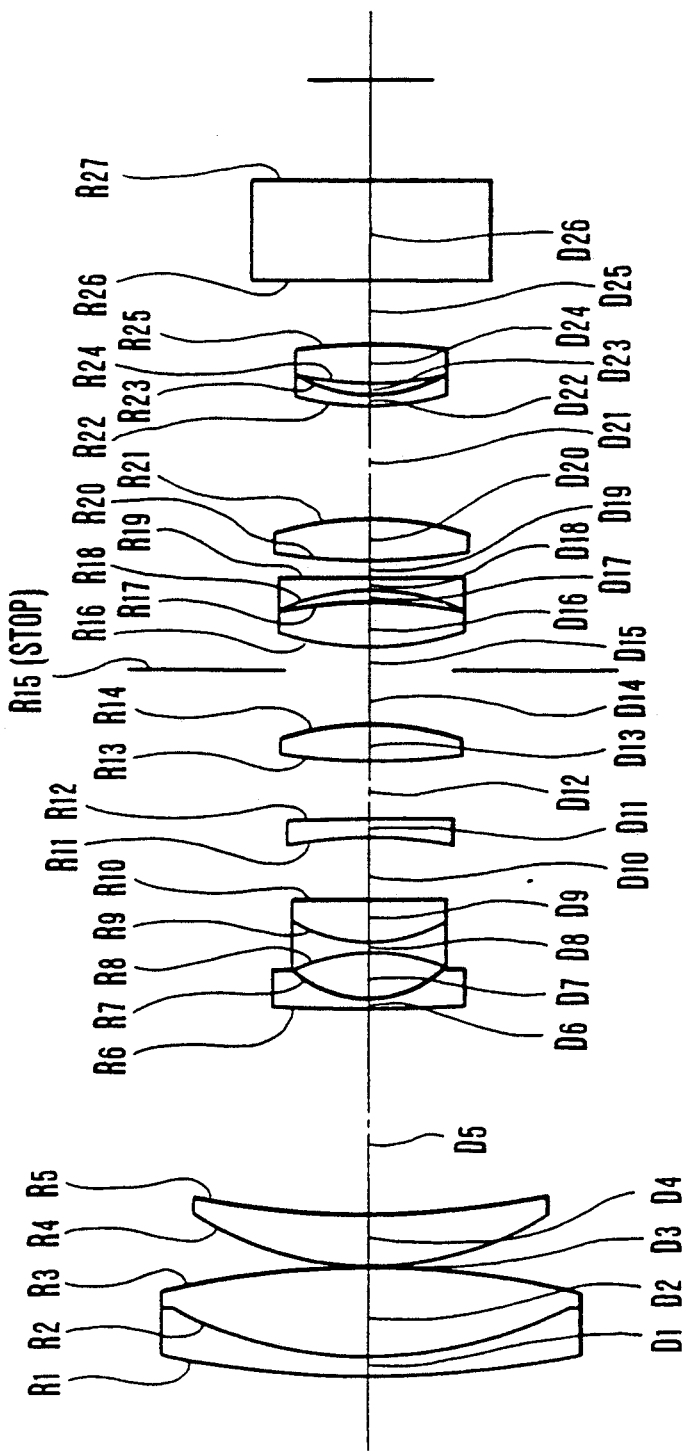
Figure 10A:
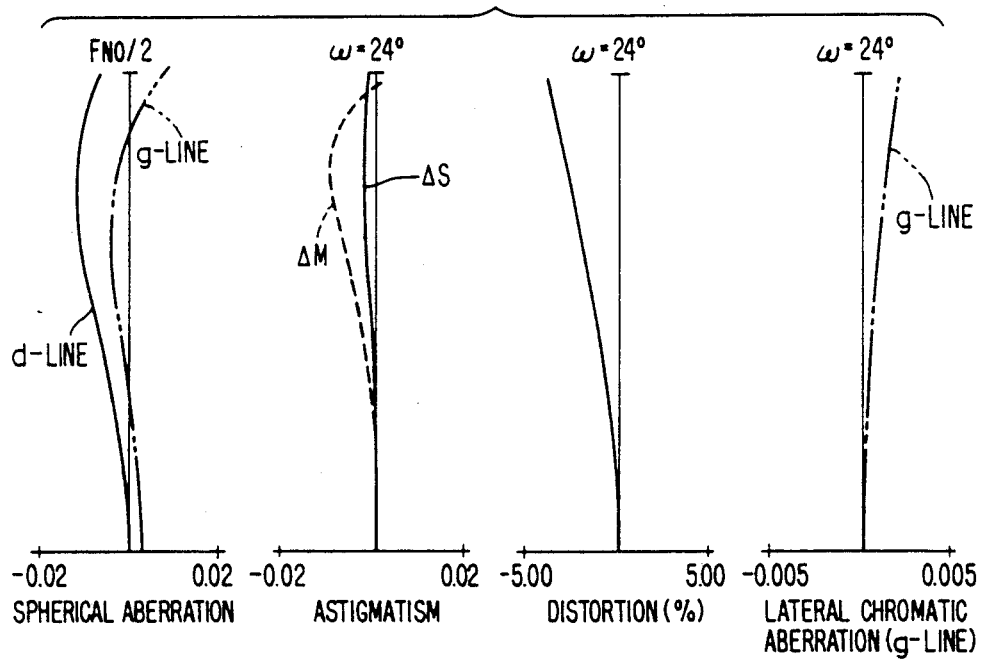
Figure 10B:
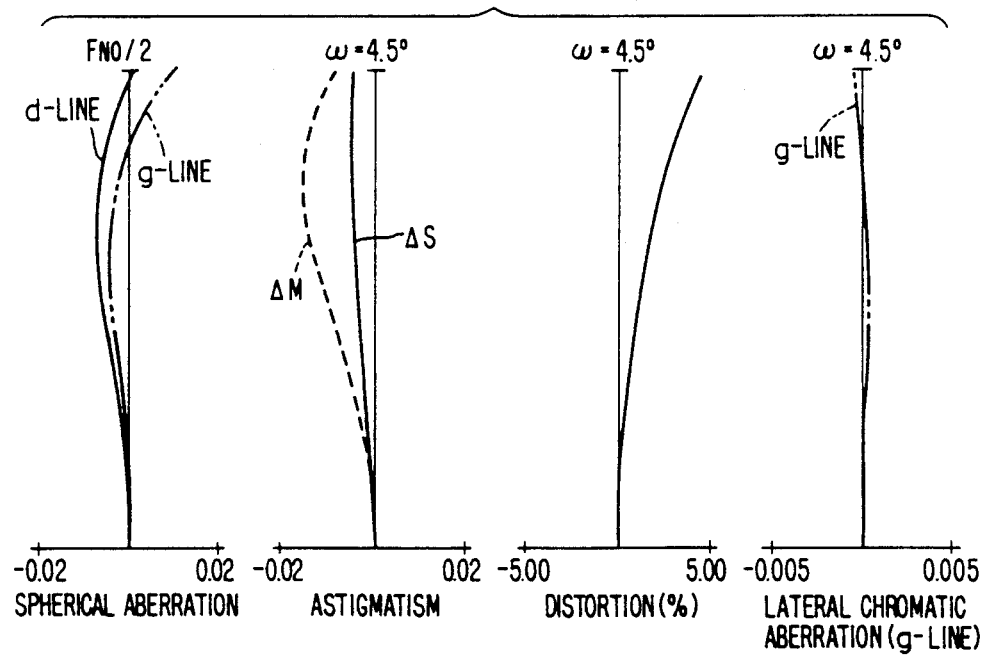

Numerical Example 2 (FIGS. 2, 10(A) and 10(B))

F = 1-5.7   FNo = 1:2   2ω = 48°-9°

| | | | |
|---|---|---|---|
| R1 = 9.212 | D1 = 0.159 | N1 = 1.80518 | ν1 = 25.4 |
| R2 = 3.732 | D2 = 0.722 | N2 = 1.51633 | ν2 = 64.1 |
| R3 = −8.793 | D3 = 0.027 | | |
| R4 = 2.935 | D4 = 0.430 | N3 = 1.62299 | ν3 = 58.1 |
| R5 = 9.844 | D5 = Variable | | |
| R6 = 11.124 | D6 = 0.111 | N4 = 1.69680 | ν4 = 55.5 |
| R7 = 1.186 | D7 = 0.339 | | |
| R8 = −1.621 | D8 = 0.111 | N5 = 1.69680 | ν5 = 55.5 |
| R9 = 1.622 | D9 = 0.305 | N6 = 1.84666 | ν6 = 23.8 |
| R10 = ∞ | D10 = Variable | | |
| R11 = −2.618 | D11 = 0.111 | N7 = 1.69680 | ν7 = 55.5 |
| R12 = −18.819 | D12 = Variable | | |
| R13 = 6.635 | D13 = 0.305 | N8 = 1.65844 | ν8 = 50.9 |
| R14 = −2.685 | D14 = 0.458 | | |
| R15 = (Stop) | D15 = 0.250 | | |
| R16 = 2.860 | D16 = 0.333 | N9 = 1.71999 | ν9 = 50.3 |
| R17 = −10.778 | D17 = 0.136 | | |
| R18 = −1.950 | D18 = 0.111 | N10 = 1.80518 | ν10 = 25.4 |
| R19 = 0.000 | D19 = 0.139 | | |
| R20 = 3.600 | D20 = 0.347 | N11 = 1.67003 | ν11 = 47.3 |
| R21 = −3.600 | D21 = 0.746 | | |
| R22 = 1.688 | D22 = 0.111 | N12 = 1.80518 | ν12 = 25.4 |
| R23 = 1.130 | D23 = 0.103 | | |
| R24 = 2.159 | D24 = 0.319 | N13 = 1.51633 | ν13 = 64.1 |
| R25 = −3.907 | D25 = 0.750 | | |
| R26 = ∞ | D26 = 0.639 | N14 = 1.51633 | ν14 = 64.1 |
| R27 = ∞ | | | |

Lens Separations during Zooming

| Focal Length | D5 | D10 | D12 |
|---|---|---|---|
| 1.00 | 0.17 | 2.54 | 0.14 |
| 2.85 | 1.75 | 0.58 | 0.52 |
| 5.70 | 2.37 | 0.28 | 0.20 |

Figure 3:
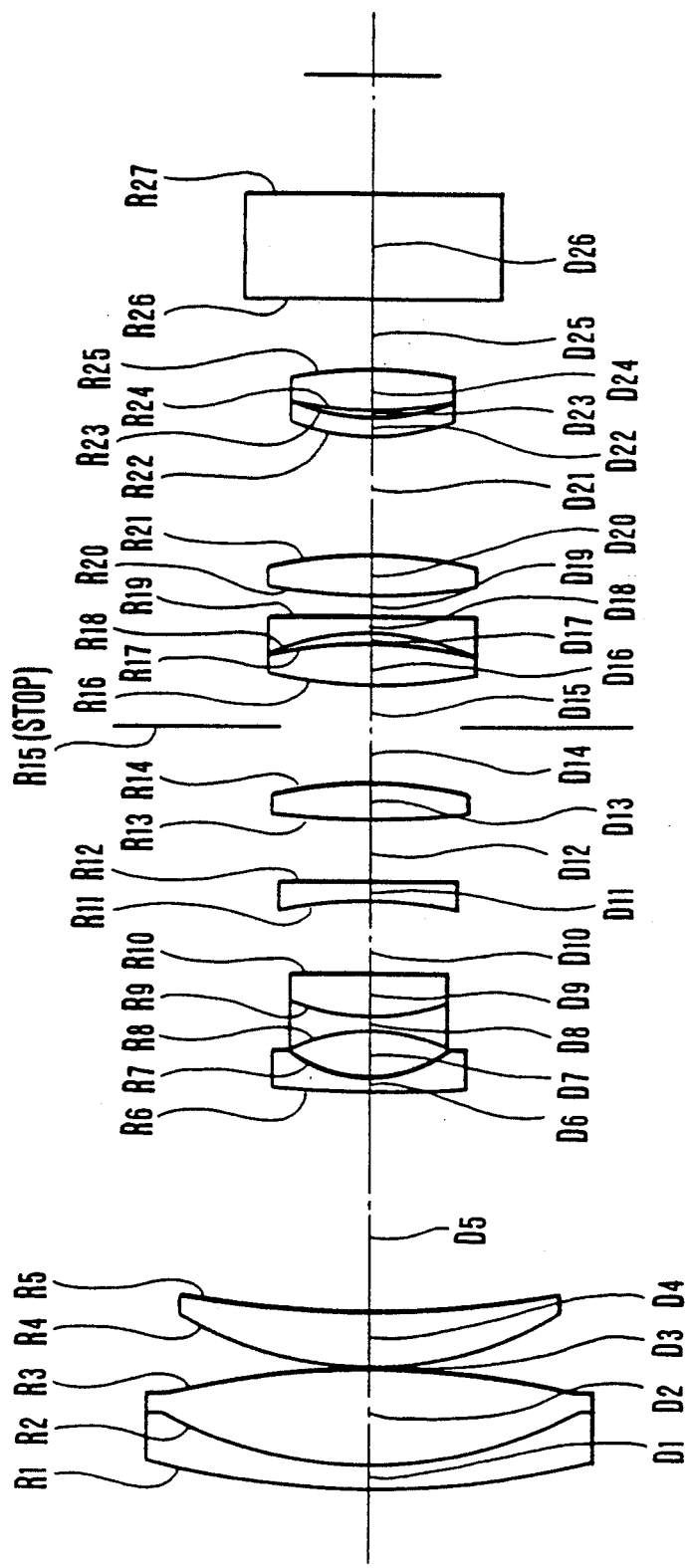
Figure 11A:
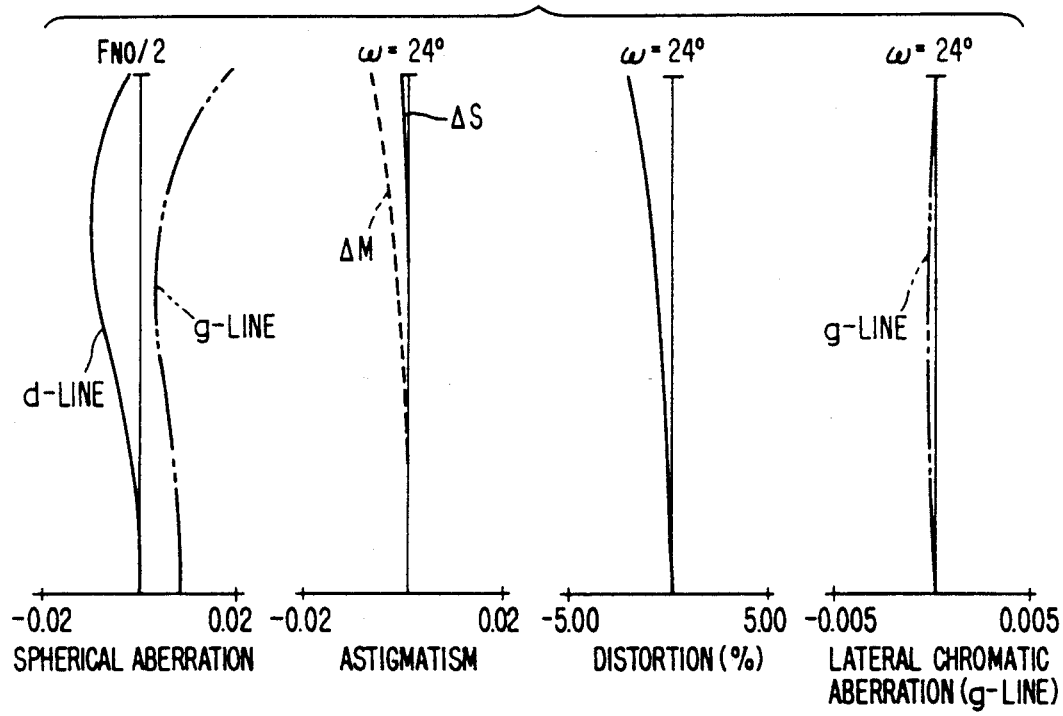
Figure 11B:
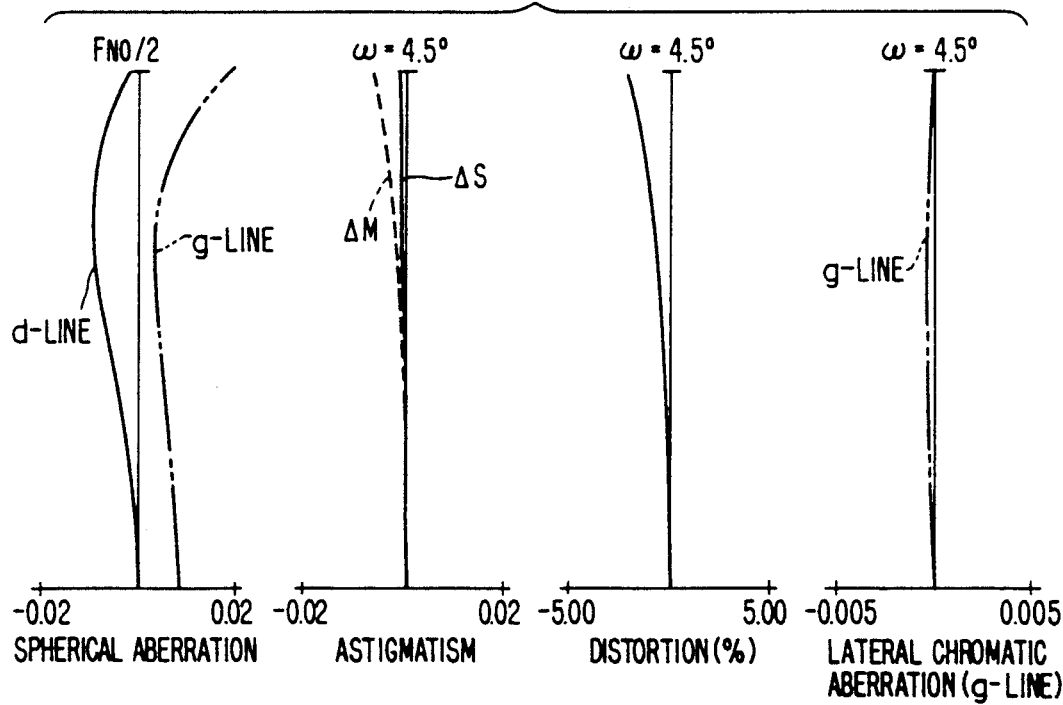

Numerical Example 3 (FIGS. 3, 11(A) and 11(B))

F = 1-5.7   FNo = 1:2   2ω = 48°-9°

| | | | |
|---|---|---|---|
| R1 = 9.591 | D1 = 0.159 | N1 = 1.80518 | ν1 = 25.4 |
| R2 = 3.783 | D2 = 0.736 | N2 = 1.51633 | ν2 = 64.1 |
| R3 = −8.670 | D3 = 0.027 | | |
| R4 = 2.936 | D4 = 0.430 | N3 = 1.63854 | ν3 = 55.4 |
| R5 = 9.488 | D5 = Variable | | |
| R6 = 10.577 | D6 = 0.111 | N4 = 1.69680 | ν4 = 55.5 |
| R7 = 1.171 | D7 = 0.340 | | |
| R8 = −1.617 | D8 = 0.111 | N5 = 1.69680 | ν5 = 55.5 |
| R9 = 1.617 | D9 = 0.333 | N6 = 1.84666 | ν6 = 23.8 |
| R10 = ∞ | D10 = Variable | | |
| R11 = −2.993 | D11 = 0.111 | N7 = 1.77250 | ν7 = 49.6 |
| R12 = −26.653 | D12 = Variable | | |
| R13 = 7.393 | D13 = 0.277 | N8 = 1.67003 | ν8 = 47.3 |
| R14 = −2.989 | D14 = 0.458 | | |
| R15 = Stop | D15 = 0.347 | | |
| R16 = 3.734 | D16 = 0.333 | N9 = 1.71999 | ν9 = 50.3 |
| R17 = −4.903 | D17 = 0.116 | | |
| R18 = −2.020 | D18 = 0.111 | N10 = 1.80518 | ν10 = 25.4 |
| R19 = 1884.711 | D19 = 0.138 | | |
| R20 = 3.807 | D20 = 0.338 | N11 = 1.63854 | ν11 = 55.4 |
| R21 = −3.807 | D21 = 0.964 | | |
| R22 = 2.026 | D22 = 0.111 | N12 = 1.80518 | ν12 = 25.4 |
| R23 = 1.307 | D23 = 0.083 | | |
| R24 = 2.525 | D24 = 0.333 | N13 = 1.62374 | ν13 = 47.1 |
| R25 = −4.651 | D25 = 0.555 | | |
| R26 = ∞ | D26 = 0.833 | N14 = 1.51633 | ν14 = 64.1 |
| R27 = ∞ | | | |

Lens Separations during Zooming

| Focal Length | D5 | D10 | D12 |
|---|---|---|---|
| 1.00 | 0.17 | 2.56 | 0.14 |
| 2.85 | 1.75 | 0.59 | 0.52 |
| 5.70 | 2.38 | 0.28 | 0.22 |

Figure 4:
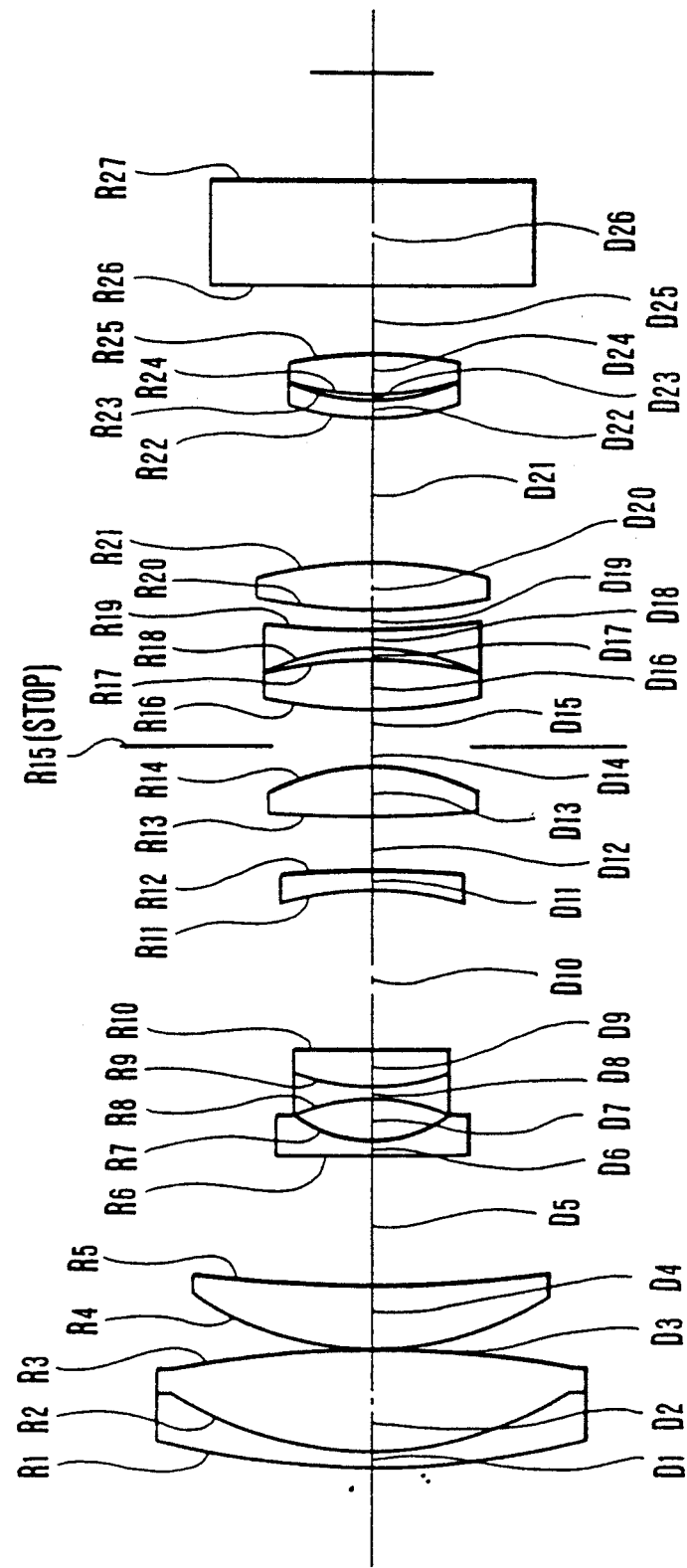

Numerical Example 4 (FIGS. 4, 12(A) and 12(B))

F = 1-5.7   FNo = 1:1.65-1.87   2ω = 48°-9°

| | | | |
|---|---|---|---|
| R1 = 8.403 | D1 = 0.173 | N1 = 1.80518 | ν1 = 25.4 |
| R2 = 3.743 | D2 = 0.791 | N2 = 1.51633 | ν2 = 64.1 |
| R3 = −9.802 | D3 = 0.020 | | |
| R4 = 3.027 | D4 = 0.458 | N3 = 1.60311 | ν3 = 60.7 |
| R5 = 11.662 | D5 = Variable | | |
| R6 = 22.998 | D6 = 0.125 | N4 = 1.77250 | ν4 = 49.5 |
| R7 = 1.354 | D7 = 0.314 | | |
| R8 = −1.833 | D8 = 0.111 | N5 = 1.69680 | ν5 = 55.5 |
| R9 = 1.833 | D9 = 0.305 | N6 = 1.84666 | ν6 = 23.9 |
| R10 = ∞ | D10 = Variable | | |

-continued

| F = 1–5.7 | FNo = 1:1.65–1.87 | 2ω = 48°–9° | | |
|---|---|---|---|---|
| R11 = −2.348 | D11 = 0.125 | N7 = 1.71299 | ν7 = 53.8 |
| R12 = −9.719 | D12 = Variable | | |
| R13 = 18.665 | D13 = 0.347 | N8 = 1.70154 | ν8 = 41.2 |
| R14 = −2.496 | D14 = 0.208 | | |
| R15 = (Stop) | D15 = 0.278 | | |
| R16 = 4.604 | D16 = 0.388 | N9 = 1.74400 | ν9 = 44.8 |
| R17 = −4.604 | D17 = 0.136 | | |
| R18 = −1.914 | D18 = 0.138 | N10 = 1.80518 | ν10 = 25.4 |
| R19 = 11.168 | D19 = 0.138 | | |
| R20 = 4.640 | D20 = 0.402 | N11 = 1.77250 | ν11 = 49.6 |
| R21 = −3.423 | D21 = 1.208 | | |
| R22 = 2.715 | D22 = 0.111 | N12 = 1.80518 | ν12 = 25.4 |
| R23 = 1.502 | D23 = 0.078 | | |
| R24 = 2.580 | D24 = 0.333 | N13 = 1.71299 | ν13 = 53.8 |
| R25 = −3.965 | D25 = 0.555 | | |
| R26 = ∞ | D26 = 0.833 | N14 = 1.51633 | ν14 = 64.1 |
| R27 = ∞ | | | |

Lens Separations during Zooming

| Focal Length | D5 | D10 | D12 |
|---|---|---|---|
| 1.00 | 0.17 | 2.48 | 0.22 |
| 2.85 | 1.74 | 0.59 | 0.55 |
| 5.70 | 2.36 | 0.36 | 0.16 |

Figure 5:
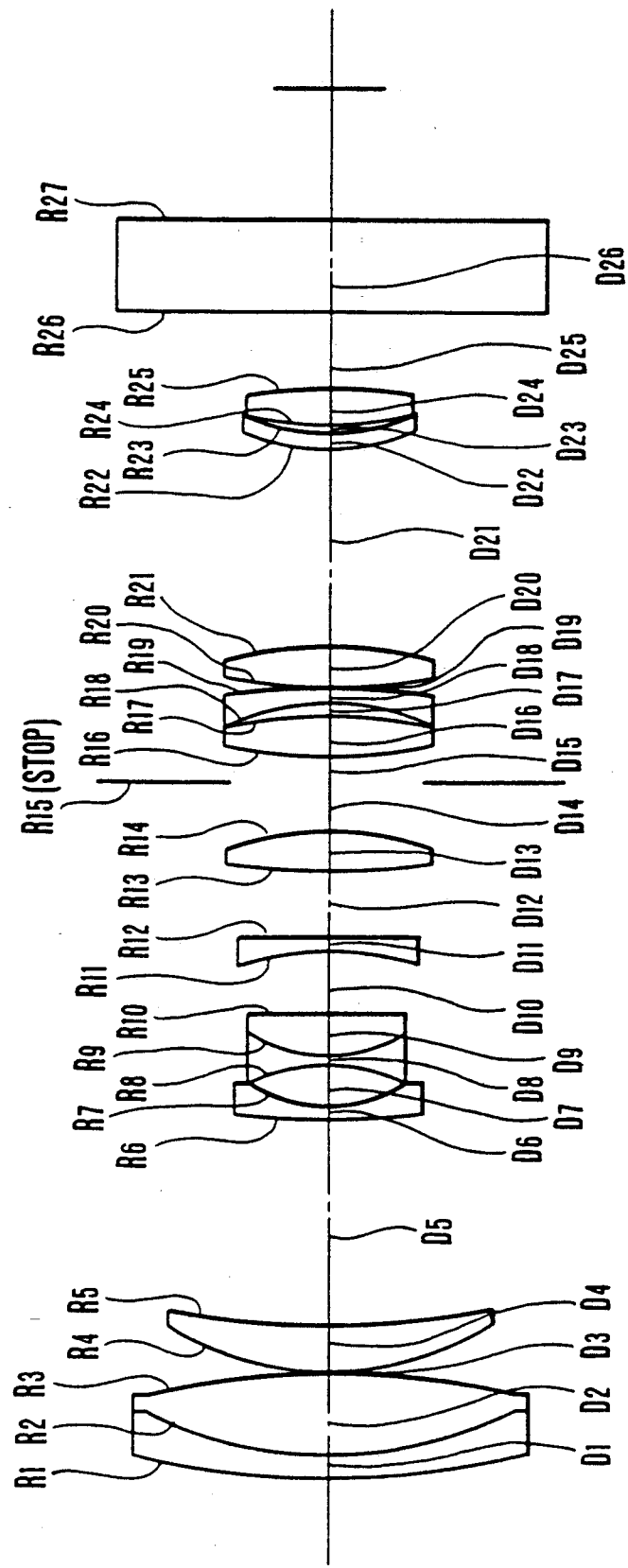
Figure 13A:
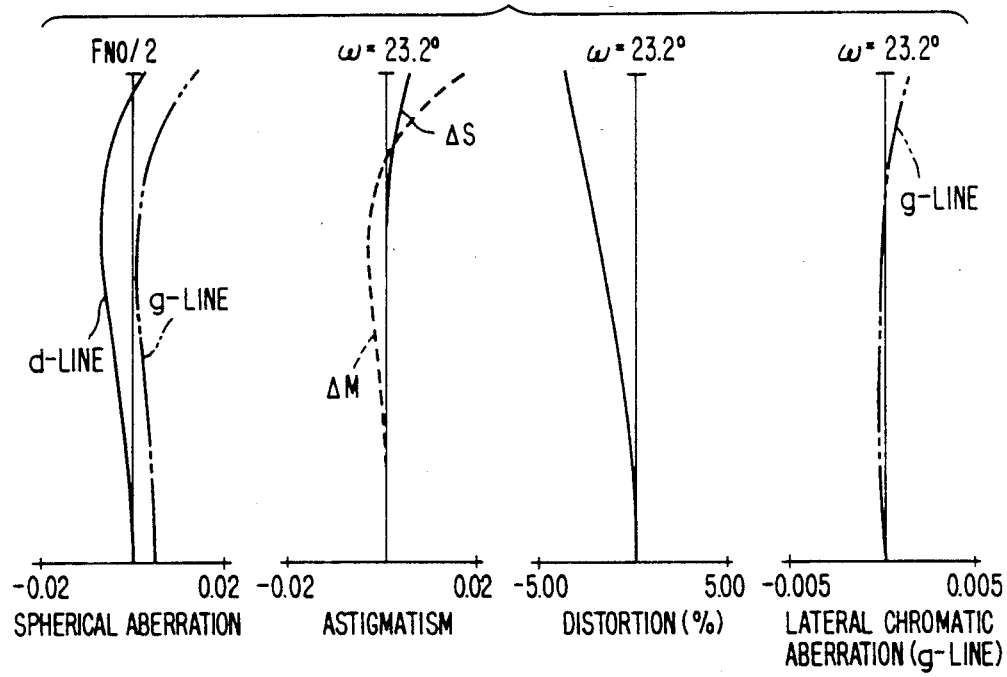
Figure 13B:
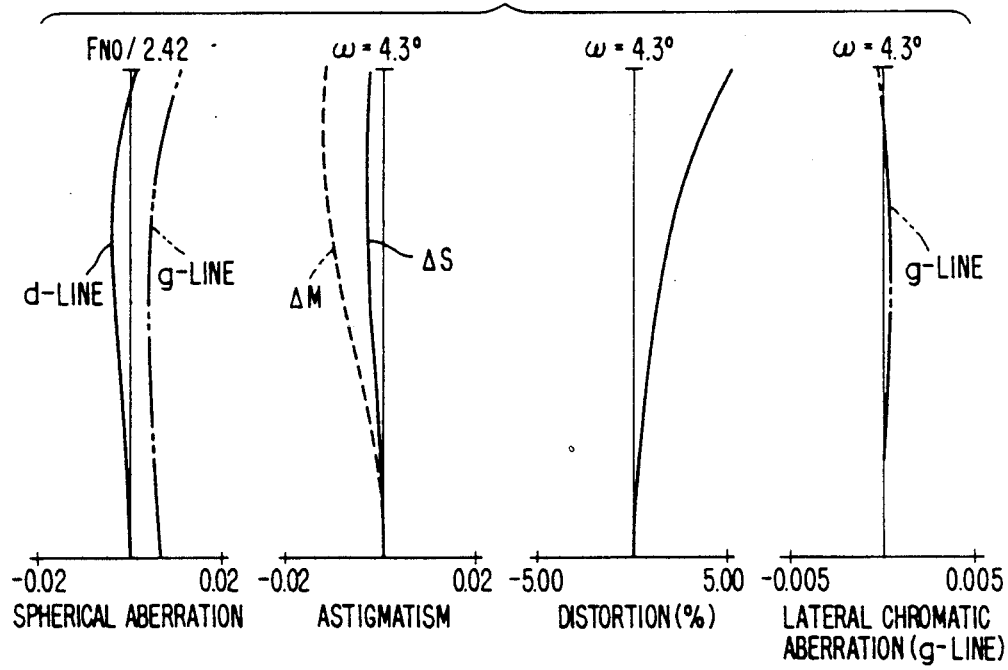

Numerical Example 5 (FIGS. 5, 13(A) and 13(B))

| F = 1–5.7 | FNo = 1:2–2.42 | 2ω = 46.4°–8.6° | | |
|---|---|---|---|---|
| R1 = 6.766 | D1 = 0.131 | N1 = 1.80518 | ν1 = 25.4 |
| R2 = 2.968 | D2 = 0.585 | N2 = 1.51633 | ν2 = 64.1 |
| R3 = −6.020 | D3 = 0.020 | | |
| R4 = 2.336 | D4 = 0.282 | N3 = 1.60311 | ν3 = 60.7 |
| R5 = 5.996 | D5 = Variable | | |
| R6 = 8.529 | D6 = 0.080 | N4 = 1.69680 | ν4 = 55.5 |
| R7 = 1.095 | D7 = 0.272 | | |
| R8 = −1.317 | D8 = 0.070 | N5 = 1.69680 | ν5 = 55.5 |
| R9 = 1.317 | D9 = 0.252 | N6 = 1.84666 | ν6 = 23.9 |
| R10 = 57.505 | D10 = Variable | | |
| R11 = −2.356 | D11 = 0.080 | N7 = 1.69680 | ν7 = 55.5 |
| R12 = −35.687 | D12 = Variable | | |
| R13 = 6.517 | D13 = 0.272 | N8 = 1.71299 | ν8 = 53.8 |
| R14 = −2.233 | D14 = 0.333 | | |
| R15 = (Stop) | D15 = 0.182 | | |
| R16 = 3.944 | D16 = 0.242 | N9 = 1.62299 | ν9 = 58.1 |
| R17 = −5.330 | D17 = 0.118 | | |
| R18 = −1.620 | D18 = 0.090 | N10 = 1.80518 | ν10 = 25.4 |
| R19 = −12.394 | D19 = 0.015 | | |
| R20 = 4.276 | D20 = 0.262 | N11 = 1.67003 | ν11 = 47.3 |
| R21 = −2.993 | D21 = 1.338 | | |
| R22 = 1.825 | D22 = 0.070 | N12 = 1.80518 | ν12 = 25.4 |
| R23 = 1.201 | D23 = 0.072 | | |
| R24 = 2.190 | D24 = 0.242 | N13 = 1.65844 | ν13 = 50.9 |
| R25 = −4.004 | D25 = 0.505 | | |
| R26 = ∞ | D26 = 0.606 | N14 = 1.51633 | ν14 = 64.1 |
| R27 = ∞ | | | |

Lens Separations during Zooming

| Focal Length | D5 | D10 | D12 |
|---|---|---|---|
| 1.00 | 0.11 | 2.00 | 0.20 |
| 2.85 | 1.42 | 0.42 | 0.47 |
| 5.70 | 1.94 | 0.25 | 0.12 |

Figure 6:
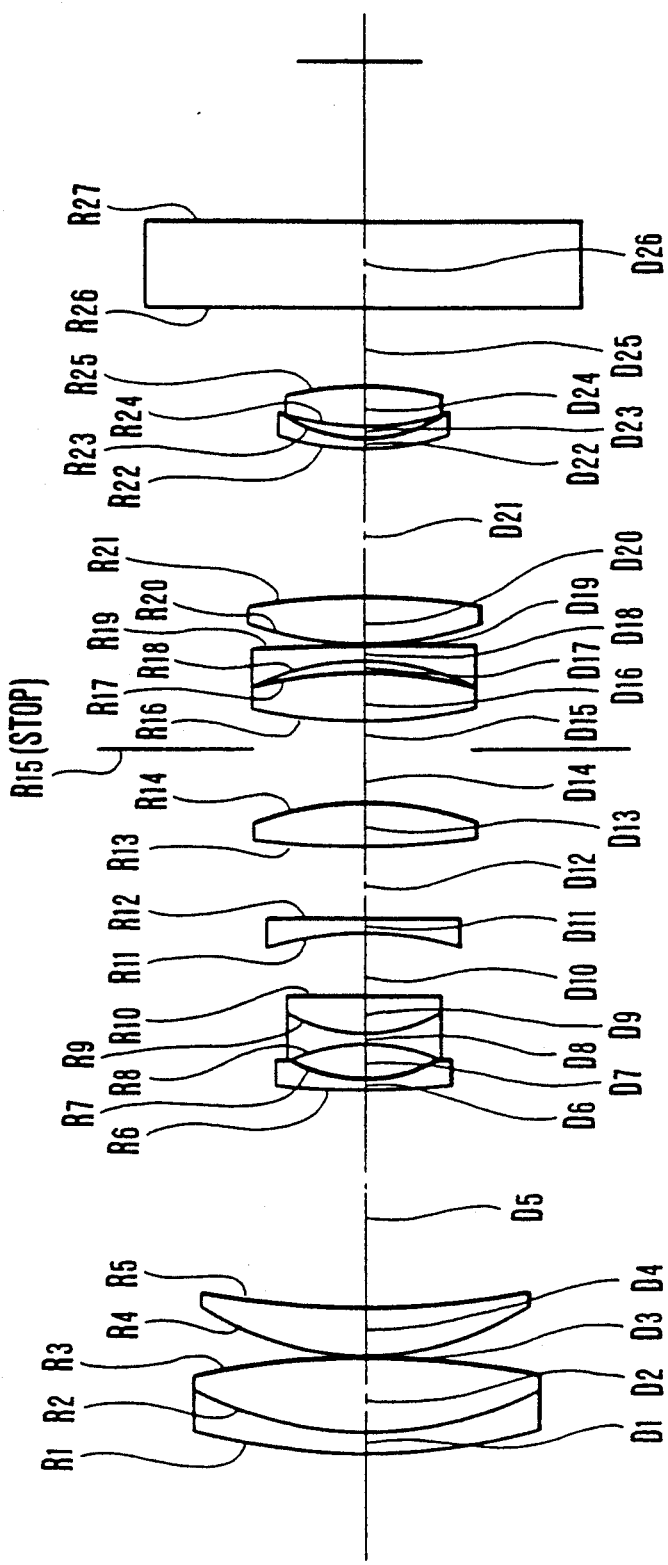
Figure 14A:
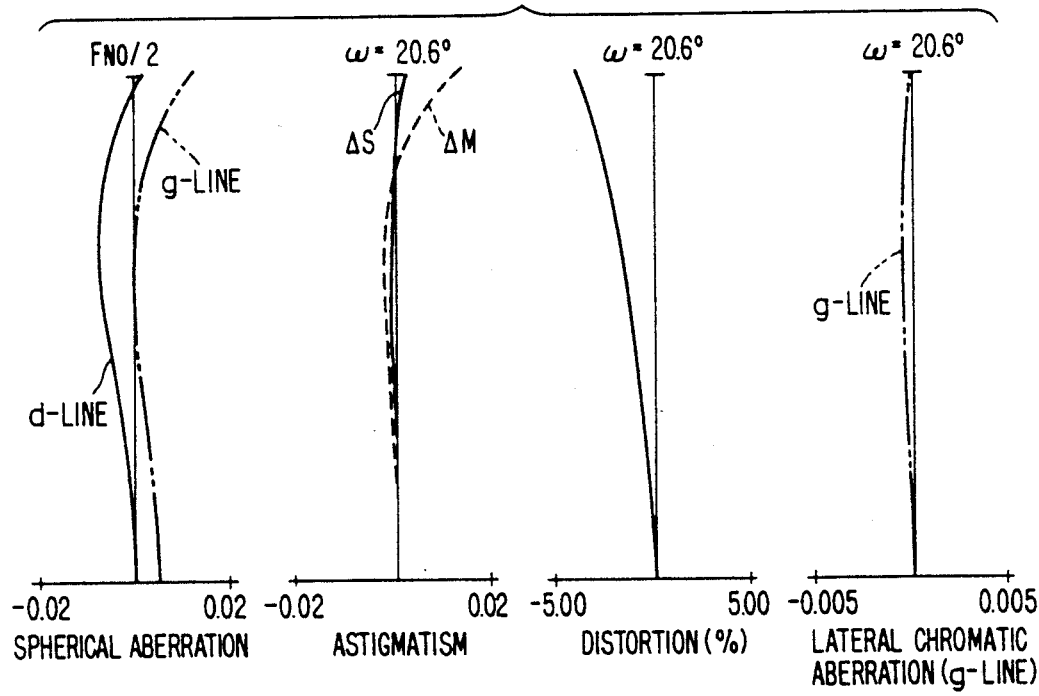
Figure 14B:
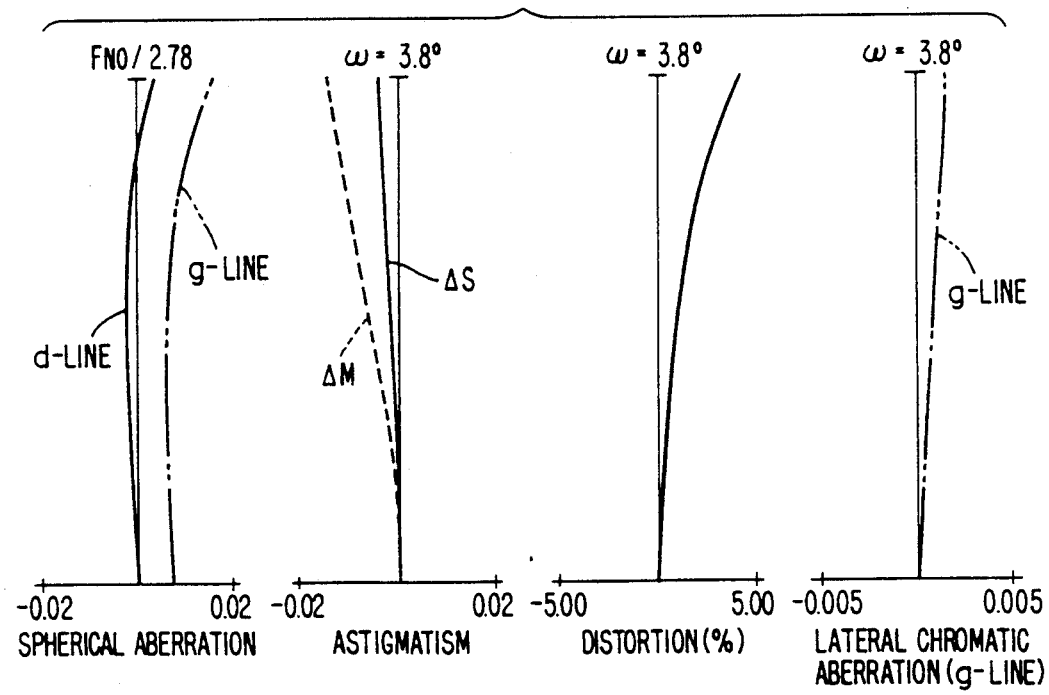

Numerical Example 6 (FIGS. 6, 14(a) and 14(B))

| F = 1–5.7 | FNo = 1:2–2.78 | 2ω = 41.2°–7.6° | | |
|---|---|---|---|---|
| R1 = 5.579 | D1 = 0.105 | N1 = 1.80518 | ν1 = 25.4 |
| R2 = 2.666 | D2 = 0.414 | N2 = 1.51633 | ν2 = 64.1 |
| R3 = −5.535 | D3 = 0.017 | | |
| R4 = 2.095 | D4 = 0.229 | N3 = 1.58913 | ν3 = 61.2 |
| R5 = 4.923 | D5 = Variable | | |
| R6 = 7.214 | D6 = 0.070 | N4 = 1.69680 | ν4 = 55.5 |
| R7 = 1.065 | D7 = 0.199 | | |
| R8 = −1.246 | D8 = 0.070 | N5 = 1.69680 | ν5 = 55.5 |
| R9 = 1.246 | D9 = 0.194 | N6 = 1.84666 | ν6 = 23.9 |
| R10 = 10.902 | D10 = Variable | | |
| R11 = −2.160 | D11 = 0.070 | N7 = 1.69680 | ν7 = 55.5 |
| R12 = −42.541 | D12 = Variable | | |
| R13 = 8.949 | D13 = 0.256 | N8 = 1.69680 | ν8 = 55.5 |
| R14 = −1.821 | D14 = 0.291 | | |
| R15 = (Stop) | D15 = 0.159 | | |
| R16 = 2.592 | D16 = 0.282 | N9 = 1.58913 | ν9 = 61.2 |
| R17 = −3.507 | D17 = 0.078 | | |
| R18 = −1.703 | D18 = 0.088 | N10 = 1.80518 | ν10 = 25.4 |
| R19 = −96.552 | D19 = 0.013 | | |
| R20 = 1.883 | D20 = 0.264 | N11 = 1.54814 | ν11 = 45.8 |
| R21 = −7.206 | D21 = 0.896 | | |
| R22 = 1.458 | D22 = 0.070 | N12 = 1.83400 | ν12 = 37.2 |
| R23 = 0.954 | D23 = 0.070 | | |
| R24 = 2.022 | D24 = 0.220 | N13 = 1.51823 | ν13 = 59.0 |
| R25 = −2.496 | D25 = 0.441 | | |
| R26 = ∞ | D26 = 0.485 | N14 = 1.51633 | ν14 = 64.1 |
| R27 = ∞ | | | |

Lens Separations during Zooming

| Focal Length | D5 | D10 | D12 |
|---|---|---|---|
| 1.00 | 0.11 | 1.83 | 0.17 |
| 2.85 | 1.30 | 0.39 | 0.42 |
| 5.70 | 1.78 | 0.25 | 0.09 |

Figure 7:
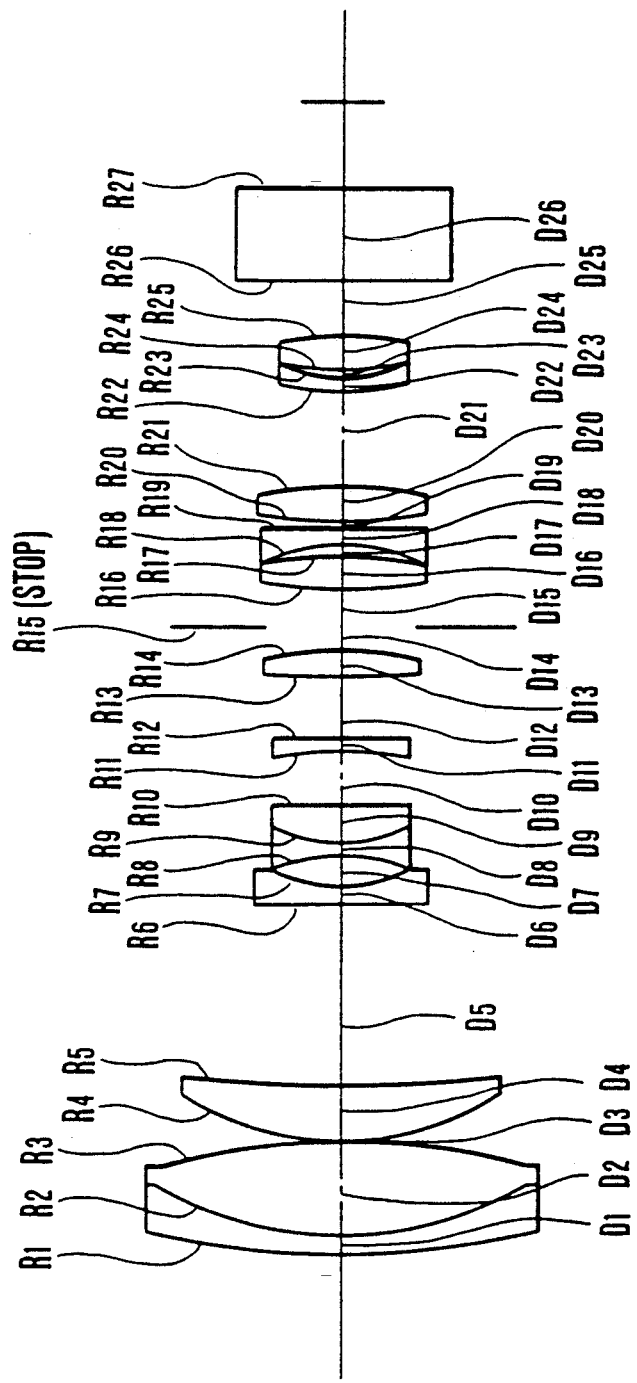
Figure 15A:
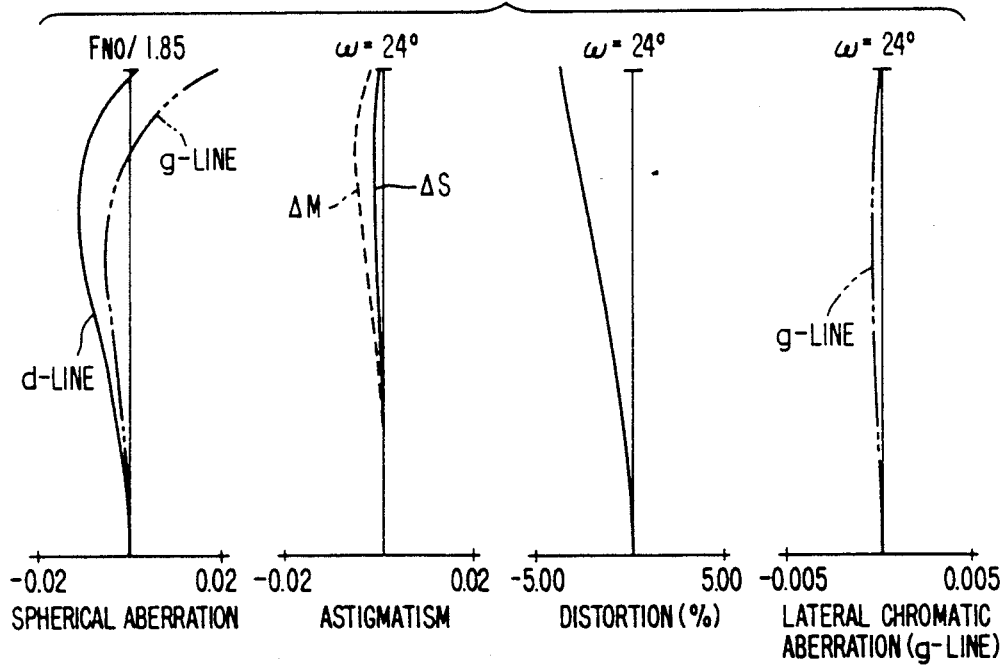
Figure 15B:
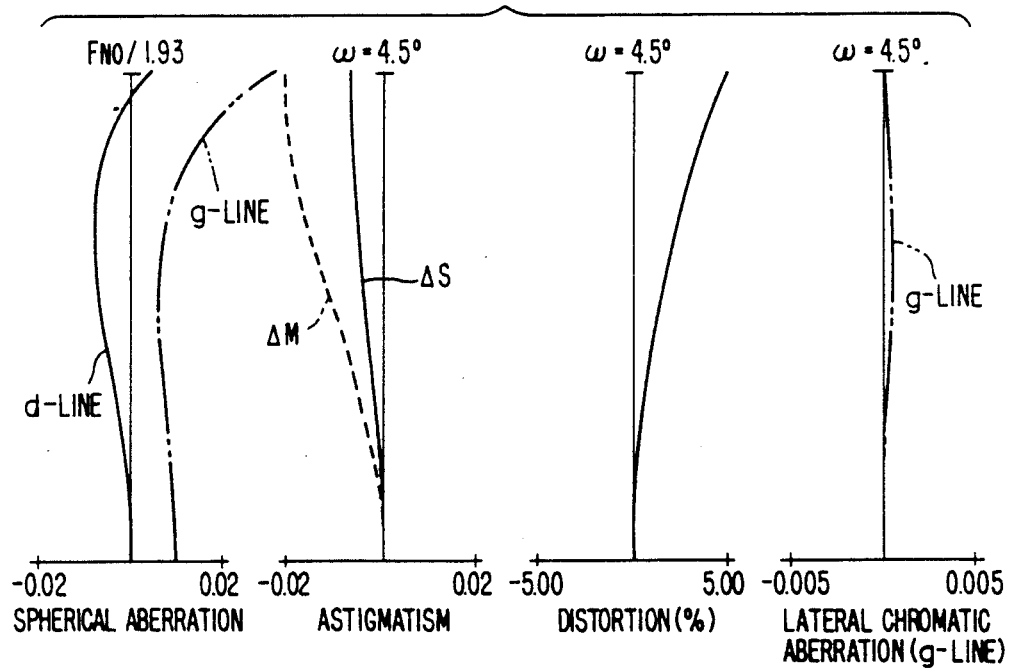

Numerical Example 7 (FIGS. 7, 15(A) and 15(B))

| F = 1–5.7 | FNo = 1:1.85–1.93 | 2ω = 48°–9° | | |
|---|---|---|---|---|
| R1 = 8.316 | D1 = 0.173 | N1 = 1.80518 | ν1 = 25.4 |
| R2 = 3.747 | D2 = 0.847 | N2 = 1.51633 | ν2 = 64.1 |
| R3 = −8.737 | D3 = 0.027 | | |
| R4 = 2.965 | D4 = 0.472 | N3 = 1.58913 | ν3 = 61.2 |
| R5 = 9.946 | D5 = Variable | | |
| R6 = 38.512 | D6 = 0.125 | N4 = 1.77250 | ν4 = 49.6 |
| R7 = 1.388 | D7 = 0.327 | | |
| R8 = −1.845 | D8 = 0.111 | N5 = 1.69680 | ν5 = 55.5 |
| R9 = 1.846 | D9 = 0.319 | N6 = 1.84666 | ν6 = 23.9 |
| R10 = ∞ | D10 = Variable | | |
| R11 = −2.723 | D11 = 0.111 | N7 = 1.71299 | ν7 = 53.8 |
| R12 = −21.652 | D12 = Variable | | |
| R13 = 6.360 | D13 = 0.277 | N8 = 1.70154 | ν8 = 41.2 |
| R14 = −3.347 | D14 = 0.208 | | |
| R15 = (Stop) | D15 = 0.347 | | |
| R16 = 4.488 | D16 = 0.333 | N9 = 1.74400 | ν9 = 44.8 |
| R17 = −4.488 | D17 = 0.116 | | |
| R18 = −1.773 | D18 = 0.111 | N10 = 1.80518 | ν10 = 25.4 |
| R19 = 251.515 | D19 = 0.069 | | |
| R20 = 4.438 | D20 = 0.333 | N11 = 1.77250 | ν11 = 49.6 |
| R21 = −3.399 | D21 = 0.887 | | |
| R22 = 2.675 | D22 = 0.111 | N12 = 1.80518 | ν12 = 25.4 |
| R23 = 1.339 | D23 = 0.065 | | |
| R24 = 2.158 | D24 = 0.333 | N13 = 1.65844 | ν13 = 50.9 |
| R25 = −3.632 | D25 = 0.555 | | |
| R26 = ∞ | D26 = 0.833 | N14 = 1.51633 | ν14 = 64.1 |
| R27 = ∞ | | | |

Lens Separations during Zooming

| Focal Length | D5 | D10 | D12 |
|---|---|---|---|
| 1.00 | 0.19 | 2.40 | 0.25 |
| 2.85 | 1.74 | 0.55 | 0.56 |

-continued

| Focal Length | D5 | D10 | D12 |
|---|---|---|---|
| 5.70 | 2.34 | 0.36 | 0.14 |

Figure 8:
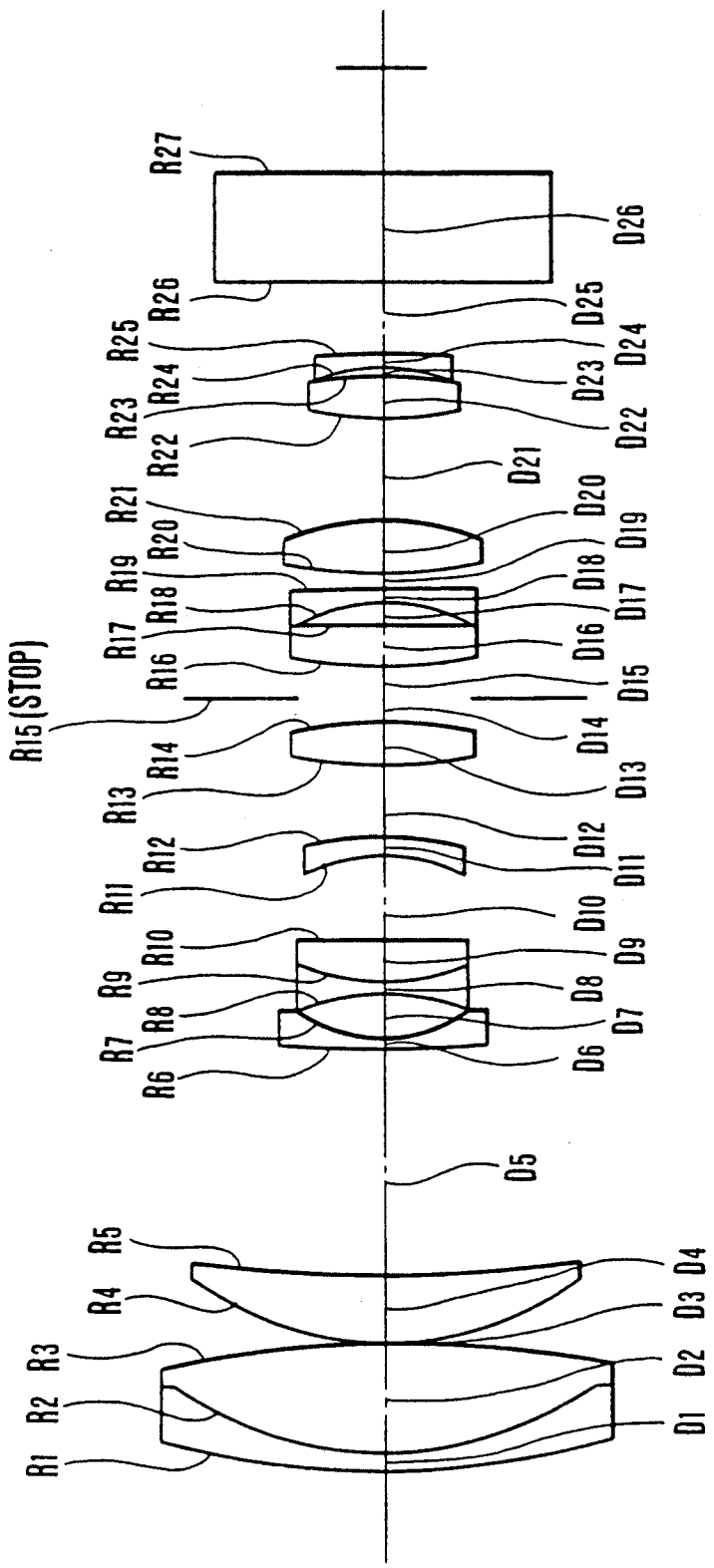
Figure 16A:
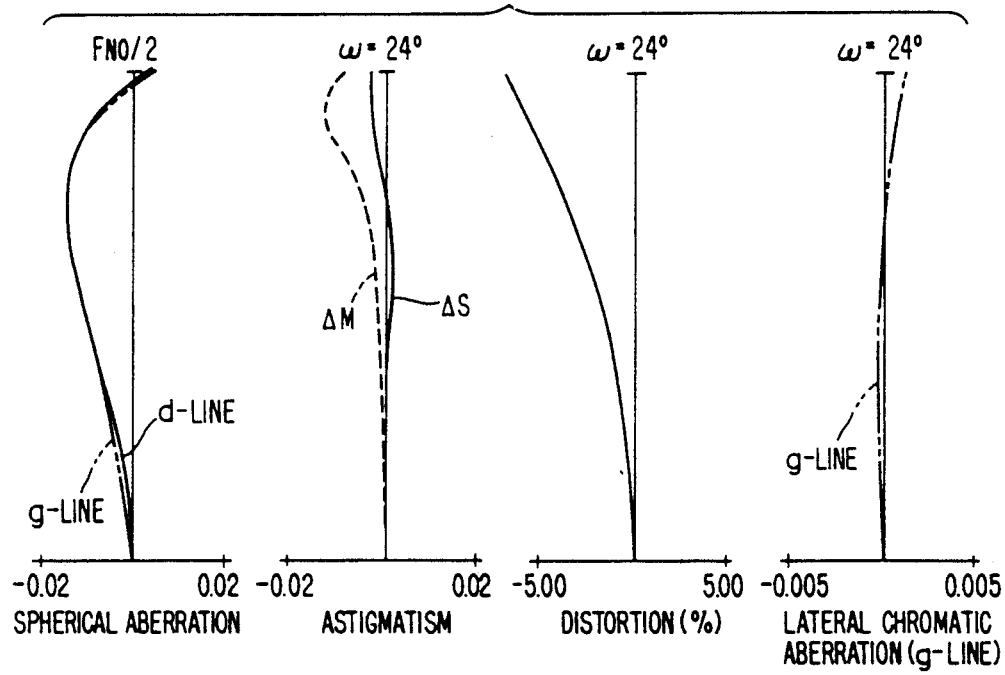
Figure 16B:
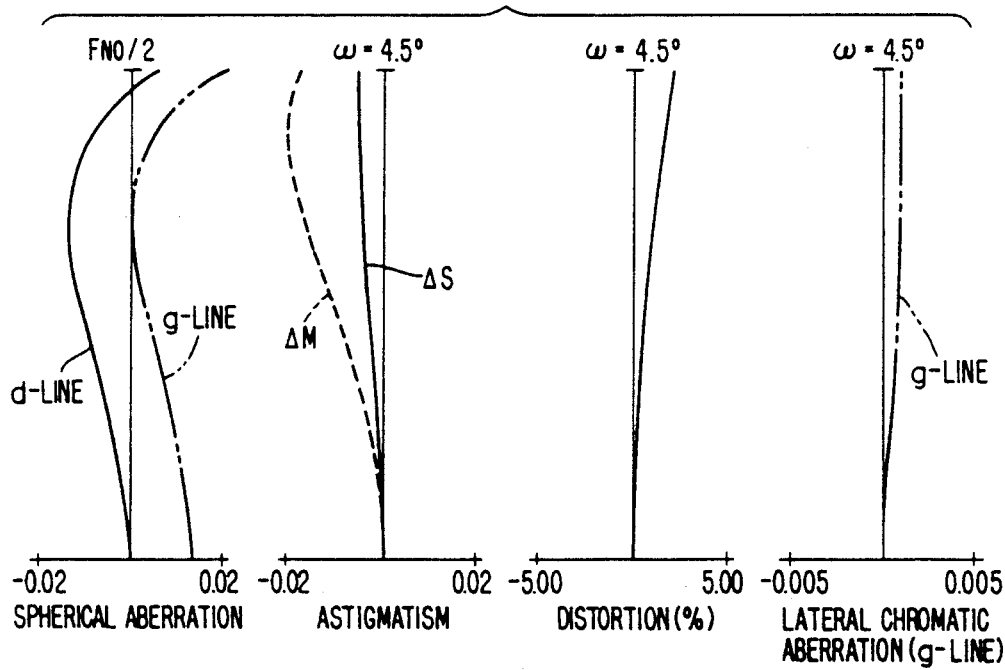

Numerical Example 8 (FIGS. 8, 16(A) and 16(B))

$F = 1-5.7 \quad FNo = 1:2 \quad 2\omega = 48°-9°$

| | | | |
|---|---|---|---|
| R1 = 7.980 | D1 = 0.173 | N1 = 1.80518 | ν1 = 25.4 |
| R2 = 3.677 | D2 = 0.791 | N2 = 1.51633 | ν2 = 64.1 |
| R3 = −10.945 | D3 = 0.020 | | |
| R4 = 3.010 | D4 = 0.458 | N3 = 1.60311 | ν3 = 60.7 |
| R5 = 11.966 | D5 = Variable | | |
| R6 = 7.156 | D6 = 0.125 | N4 = 1.77250 | ν4 = 49.6 |
| R7 = 1.370 | D7 = 0.333 | | |
| R8 = −1.793 | D8 = 0.111 | N5 = 1.69680 | ν5 = 55.5 |
| R9 = 1.793 | D9 = 0.305 | N6 = 1.84666 | ν6 = 23.9 |
| R10 = 13.585 | D10 = Variable | | |
| R11 = −1.469 | D11 = 0.125 | N7 = 1.69680 | ν7 = 55.5 |
| R12 = −2.934 | D12 = Variable | | |
| R13 = 3.874 | D13 = 0.305 | N8 = 1.70200 | ν8 = 40.1 |
| R14 = −5.142 | D14 = 0.208 | | |
| R15 = (Stop) | D15 = 0.278 | | |
| R16 = 5.499 | D16 = 0.319 | N9 = 1.74400 | ν9 = 44.8 |
| R17 = −10.325 | D17 = 0.138 | | |
| R18 = −1.821 | D18 = 0.138 | N10 = 1.80518 | ν10 = 25.4 |
| R19 = −23.096 | D19 = 0.097 | | |
| R20 = 3.628 | D20 = 0.388 | N11 = 1.77250 | ν11 = 49.6 |
| R21 = −3.061 | D21 = 0.833 | | |
| R22 = 2.701 | D22 = 0.319 | N12 = 1.71299 | ν12 = 53.8 |
| R23 = −3.168 | D23 = 0.069 | | |
| R24 = −1.707 | D24 = 0.111 | N13 = 1.80518 | ν13 = 25.4 |
| R25 = −8.327 | D25 = 0.555 | | |
| R26 = ∞ | D26 = 0.833 | N14 = 1.51633 | ν14 = 64.1 |
| R27 = ∞ | | | |

Lens Separations during Zooming

| Focal Length | D5 | D10 | D12 |
|---|---|---|---|
| 1.00 | 0.17 | 2.59 | 0.27 |
| 3.00 | 1.76 | 0.70 | 0.56 |
| 5.70 | 2.31 | 0.56 | 0.15 |

As has been described above, the present invention has achieved the possibility of providing a zoom lens which fulfills the requirements of preserving good optical performance and of elongating the back focal distance simultaneously.

What is claimed is:

1. A zoom lens comprising:
   when counted from the object side,
   a first lens unit having a positive refractive power;
   a second lens unit having a negative refractive power and arranged to move along an optical axis for varying the image magnification;
   a third lens unit arranged to move along the optical axis as the image magnification is varied; and
   a fourth lens unit having a positive refractive power and arranged to be stationary,
   said fourth lens unit including a ti-convex first lens, when counted from the object side, a positive second lens, a negative third lens having a strong concave surface facing the object side, a positive fourth lens, a fifth lens having a strong concave surface facing the image side, and a positive sixth lens, and satisfying the following condition:

$$0.5 < D/Fw < 1.5$$

where D is the air separation between said positive fourth lens and said fifth lens, and Fw is the shortest focal length of the entire lens system.

2. A zoom lens according to claim 1, satisfying the following condition:

$$-0.3 < B < -0.08$$

where $\beta$ is the overall magnification of said second lens to said sixth lens of said fourth lens unit.

3. A zoom lens according to claim 1, satisfying the following condition:

$$-1.5 < \phi_B/\phi_A < 0$$

where $\phi_A$ and $\phi_B$ are the curvatures of front and rear surfaces of said fourth lens respectively.

4. A zoom lens according to claim 1, satisfying the following condition:

$$0.9 < F_B/F_A < 2.4$$

where $F_A$ is the overall focal length of said second lens to said fourth lens, and $F_B$ is the overall focal length of said fifth lens and said sixth lens.

* * * * *

UNITED STATES PATENT AND TRADEMARK OFFICE
CERTIFICATE OF CORRECTION

PATENT NO. : 5,056,900

DATED : October 15, 1991

INVENTOR(S) : HITOSHI MUKAIYA, ET AL.

It is certified that error appears in the above-identified patent and that said Letters Patent is hereby corrected as shown below:

Column 1:

Line 52, Close up right margin.

Line 53, Close up left margin.

Column 3:

Line 9, "securing" should be deleted.

Column 4:

Line 19, "&he" should read --the--.

Line 31, "correct" should read --correction of--.

Line 58, "$\gamma i$" should read --$\upsilon i$--.

Column 10:

Line 12, "ti-convex first lens," should read --bi-convex first lens,--.

Line 27, "$-0.3<B<-0.08$" should read -- $-0.3<\beta<-0.08$--.

Signed and Sealed this

Thirteenth Day of April, 1993

*Attest:*

STEPHEN G. KUNIN

*Attesting Officer*　　*Acting Commissioner of Patents and Trademarks*